United States Patent
Feng

(10) Patent No.: US 9,521,588 B2
(45) Date of Patent: Dec. 13, 2016

(54) ESTABLISHING DATA STRATEGY

(71) Applicant: Samsung Electronics Co., Ltd., Gyeonggi-do (KR)

(72) Inventor: Suiyu Feng, Guangdong (CN)

(73) Assignee: Samsung Electronics Co., Ltd., Yeongton-gu, Suwon-si, Gyeonggi-do (KR)

( * ) Notice: Subject to any disclaimer, the term of this patent is extended or adjusted under 35 U.S.C. 154(b) by 15 days.

(21) Appl. No.: 14/323,323

(22) Filed: Jul. 3, 2014

(65) Prior Publication Data

US 2015/0063230 A1    Mar. 5, 2015

(30) Foreign Application Priority Data

Sep. 3, 2013  (CN) .......................... 2013 1 0395564

(51) Int. Cl.
*H04W 84/12*   (2009.01)
*H04W 28/18*   (2009.01)
*H04W 48/18*   (2009.01)
*H04W 88/06*   (2009.01)
*H04W 88/04*   (2009.01)

(52) U.S. Cl.
CPC ............. *H04W 28/18* (2013.01); *H04W 48/18* (2013.01); *H04W 84/12* (2013.01); *H04W 88/04* (2013.01); *H04W 88/06* (2013.01)

(58) Field of Classification Search
CPC ...... H04W 48/00; H04W 28/18; H04W 84/12; H04W 88/06; H04W 88/04
See application file for complete search history.

(56) References Cited

U.S. PATENT DOCUMENTS

| 2010/0290444 A1* | 11/2010 | Souissi | ................ H04W 88/04 370/338 |
| 2013/0331028 A1* | 12/2013 | Kuehnel | ............... H04W 76/02 455/41.1 |
| 2014/0086146 A1* | 3/2014 | Kim | ...................... H04W 28/02 370/328 |

FOREIGN PATENT DOCUMENTS

KR    10-2012-0070344    *  6/2012    ............ H04W 88/04

* cited by examiner

*Primary Examiner* — Jae Y Lee
(74) *Attorney, Agent, or Firm* — Cha & Reiter, LLC

(57) ABSTRACT

An apparatus and method for adjusting a data strategy in a terminal is provided. A connection is made to a hotspot provider. A network type used by the provider is identified and a data strategy is adjusted based at least partially on the network type.

10 Claims, 7 Drawing Sheets

ESTABLISHING DATA STRATEGY

CLAIM OF PRIORITY

This application claims the benefit under 35 U.S.C. §119 (a) of a Chinese patent application filed on Sep. 3, 2013 in the Chinese Intellectual Property Office and assigned Serial No. 201310395564.5, the entire disclosure of which is incorporated by reference herein.

BACKGROUND

Technical Field

The present disclosure relates to management of data strategy and, more particularly, to an apparatus and method for adjusting data strategy of network data in a terminal.

Description of the Related Art

Advances in network communication and signal processing have allowed more terminal products to carry out networking functions. For example, a mobile terminal, such as a smart phone, can now communicate over a wireless local area network (WLAN), such as WIFI network, or a mobile communication network (e.g., 2G, 3G, 4G, and etc.).

Since pricing between networks may differ significantly (e.g., the cost under a mobile network is much higher than that under a wired network), applications may identify the current connection mode and adjust the data usage strategy accordingly. By way of example, a shopping application in a terminal executing over a 2G network, may display photos and images as an icon or may even refrain from displaying images or photos. Over a 3G network, the photos or images may be displayed as a thumbnail or a small picture. Finally, over a WLAN, the photos or images may be displayed as a large picture or a high resolution picture.

However, when the terminal connects to a mobile network using a hotspot provider, such as a smart phone, the connection to the hotspot provider may be over WLAN. In this instance, the terminal connected to the hotspot provider may execute in accordance with WLAN, so as to adopt the data use strategy of the connection to the hotspot provider. However, not only would this arrangement make it difficult to display high-resolution or large pictures, but it may also cause the hotspot provider to consume a large amount of data. Therefore, it may be impossible to conserve data. That is, the terminal connected to the hotspot provider may consume more data than the hotspot provider itself.

For example, when a video playback application is activated and the terminal is using a 3G network, the video application may present the following prompt: "You are currently using the 3G network, and playback of any video will consume a large amount of data, will you like to continue the playback?" However, when the terminal is connected to a WLAN, the video may play without any prompt. Therefore, if terminal A using a 3G network is a hotspot provider for terminal B and terminal B connects to terminal A using WLAN, a video application in terminal B may detect the WLAN connection and use the data strategy under WLAN. That is, the application will playback the video directly without any prompt, which causes excessive data consumption by terminal A.

Some terminals try to avoid the excess data usage by installing software that limits the amount of data. However, regardless of whether a maximum data amount is set per day or whether the data ratio of the hotspot is limited, it is impossible to prevent the terminal connected to the hotspot over WLAN from consuming data continuously. Thus, the terminal may simply reach the maximum data limits sooner and preclude additional data from being consumed. Furthermore, because the terminal connected to the hotspot uses data in accordance with WLAN, a user's experience with many network applications may be devalued.

Some application software may prompt the user to manually set the data options, such as 2G/3G/WIFI, whenever the network connection is switched. However, setting the data options manually every time the network switches, may involve frequent toggling of background data synchronization. This may also significantly devalue a user's experience. Furthermore, not all users know this setting or are willing to adjust this setting. For users with many applications, each used application may need to be set, which may be inconvenient. While the data strategy may be adjusted in accordance with the network bandwidth, this may considerably increase the design complexity and may also raise the risk of error. Moreover, a hotspot may want to allow the terminal connected thereto to use WIFI even when there is not enough bandwidth. Therefore, a user may not want to adjust the data strategy completely, depending on the bandwidth, because this may make the user's experience even worse.

As such, it may be difficult to adjust the data strategy efficiently using conventional terminals.

SUMMARY

In view of the above, disclosed herein are an apparatus and method for adjusting a data strategy in a terminal based on a network type used by a WLAN hotspot provider.

In accordance with one aspect of the present disclosure, an apparatus for adjusting a data strategy in a terminal is provided. The apparatus may comprise a processor to: connect to a WLAN hotspot provider; identify a network type used by the WLAN hotspot provider; adjust a data strategy based at least partially on the network type used by the WLAN hotspot provider; and transmit and receive data in accordance with the data strategy.

In another example, the processor may further detect an input selection of the network type and identify the network type based at least partially on the input selection. In a further example, the processor may identify the network type based at least partially on information received from the WLAN hotspot provider. In yet a further example, the processor may further store the network type in a profile of the WLAN hotspot provider. In another aspect, the processor may further modify the network type stored in the profile. In one example, the network type may be indicative of a network access subtype.

In accordance with another aspect of the present disclosure, a method for adjusting a data strategy in a terminal is provided. The method may comprise connecting to a WLAN hotspot provider; identifying a network type used by the WLAN hotspot provider; adjusting a data strategy based at least partially on the network type used by the WLAN hotspot provider; and transmitting and receiving data in accordance with the data strategy.

In another example, determining the network type may further comprise detecting an input selection of the network type; and identifying the network type based at least partially on the input selection.

In a further example, determining the network type may further comprise detecting receipt of information from the WLAN hotspot provider; and identifying the network type based at least partially on the received information.

In yet another example, the method may further comprise storing the network type in a profile of the WLAN hotspot provider. In another aspect, the method may further comprise modifying the network type stored in the profile. In another example, the network type may be indicative of a network access subtype.

The techniques disclosed herein may adjust the terminal data strategy based at least partially on the network type used by the WLAN hotspot provider, thereby overcoming the disadvantageous caused by simply using the WIFI strategy in the related art.

BRIEF DESCRIPTION OF THE DRAWINGS

The above and/or other advantageous will become more apparent by the following description with reference to the figures, wherein.

DETAILED DESCRIPTION

Figure 1:
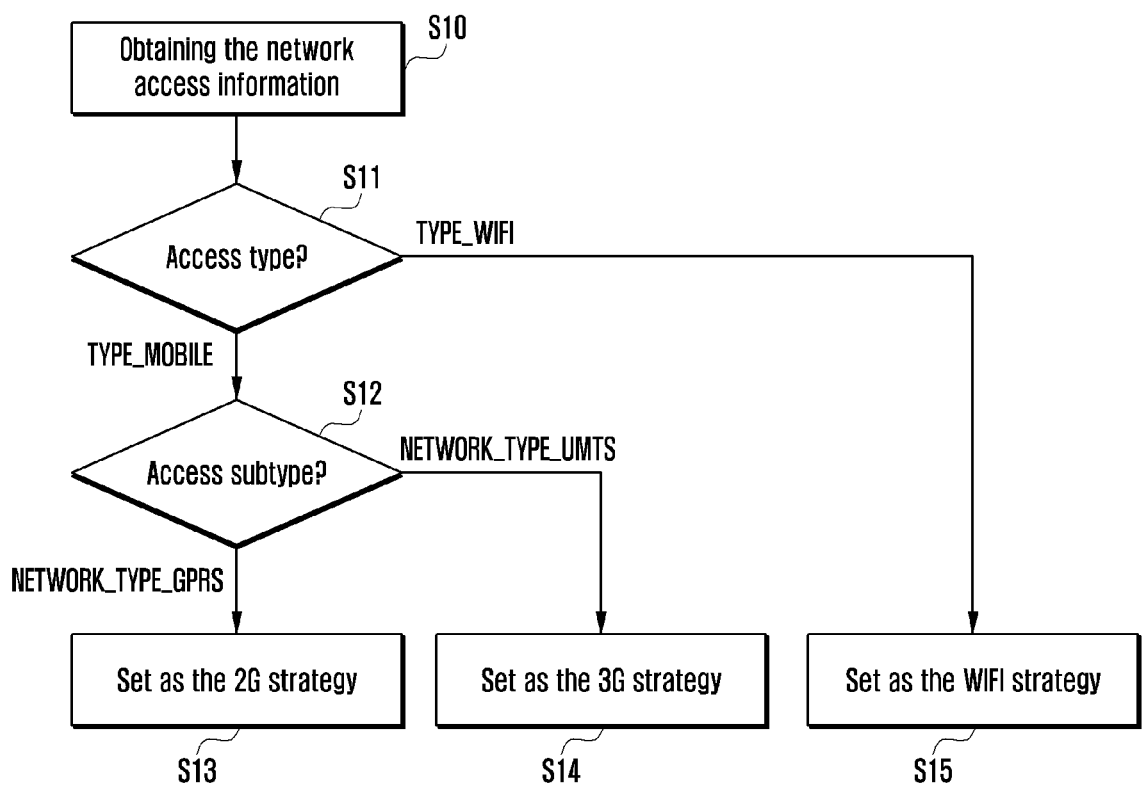
FIG. 1 illustrates a method of setting a data strategy in a terminal in accordance with the related art.

Examples of the present disclosure will be described in detail in conjunction with the figures. Like reference numerals refer to the like components throughout. In the following descriptions, the WIFI networking mode, the WIFI data usage strategy or the WIFI hotspot are described as examples related to the wireless local area network (WLAN). However, it is understood that the WLAN is not limited to WIFI and that any WLAN mode for establishing the wireless local area network, corresponding WLAN data strategy or WLAN hotspot can all be applied to the present disclosure. Conventional terminals may use WIFI to connect to a hotspot provider. In this instance, all the software installed in the terminal may adopt the data usage strategy under the WIFI mode. A conventional data strategy setting will now be described with reference to FIGS. 1, 2A, and 2B.

FIG. 1 illustrates a conventional method for setting data strategy in a terminal. With reference to FIG. 1, when the terminal is connected to the WIFI hotspot provider in a WIFI mode, in block S10, network access information is obtained by the terminal.

Figure 2A:
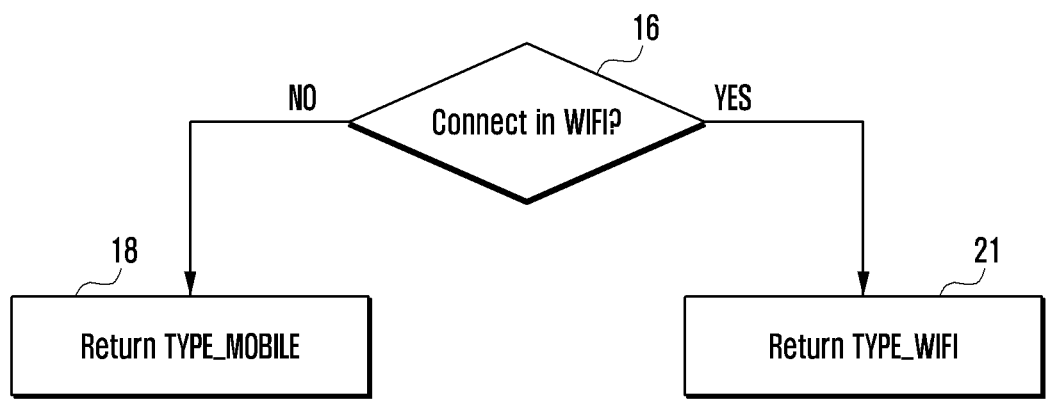
FIG. 2A and FIG. 2B illustrate a method of obtaining network access information in a terminal in accordance with the related art.
Figure 2B:
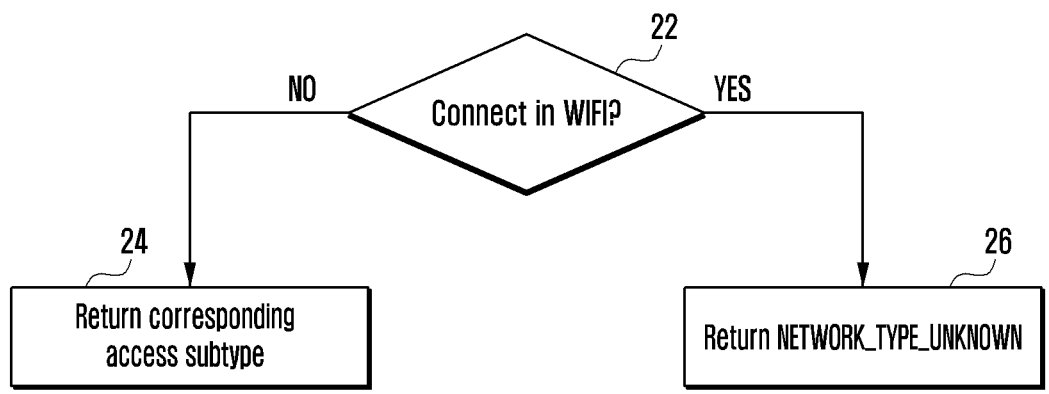

FIGS. 2A-B illustrate a conventional method of obtaining network access information. With reference to FIG. 2A, when it is determined that the terminal is connected to the network in the WIFI mode at block 16, the obtained network access type is the WIFI type at block 21 (for example, the value of TYPE_WIFI is returned in the android system); otherwise, the obtained network access type is the mobile network type at block 18 (for example, the value of TYPE_MOBILE is returned in the android system).

In addition, with reference to FIG. 2B, when it is determined that the terminal is connected to the network in the WIFI mode at block 22, the obtained network access subtype is the unknown type at block 26 (e.g., the value of NETWORK_TYPE_UNKNOWN is returned in the android system); otherwise, the obtained network access subtype is the corresponding mobile access type (e.g., when the 2G network is accessed, the corresponding value of TYPE_TYPE_GPRS or other similar values, such as NETWORK_TYPE_CDMA) is returned in the android system at block 24; when the 3G network is accessed, the value of NETWORK_TYPE_UMTS or other similar values, such as NETWORK_TYPE_HSDPA is returned in the android system.

As shown in FIGS. 2A-2B, when the terminal is connected to the network in the WIFI mode, the unknown type will be returned as the network access subtype regardless of the network type, such as a mobile network, used by the WIFI hotspot provider.

Referring back to FIG. 1, in block S11, the network access type is determined. When it is determined that the network access type is the WIFI type, in block S15, the data strategy of the terminal is adjusted to the WIFI strategy; and when it is determined that the network access type is the mobile network type, in block S12, the network access subtype is determined. When it is determined that the network access subtype is the 2G access type, in block S13, the data strategy of the terminal is adjusted to the 2G strategy; and when it is determined that the network access subtype is the 3G access type, in block S14, the date strategy of the terminal is adjusted to the 3G type.

As shown above, when a terminal is connected to the WIFI hotspot provider in the WIFI mode, the data strategy of the terminal is set to WIFI, regardless of whether the WIFI hotspot provider uses the mobile network. This may lead to undesirable results when both the terminal and the hotspot provider are using network data.

As such, the present disclosure provides an apparatus and method capable of adjusting the data strategy in accordance with the network type used by the WIFI hotspot provider. The exemplary embodiments of the present disclosure will be described hereinafter with reference to the figures.

Figure 3:
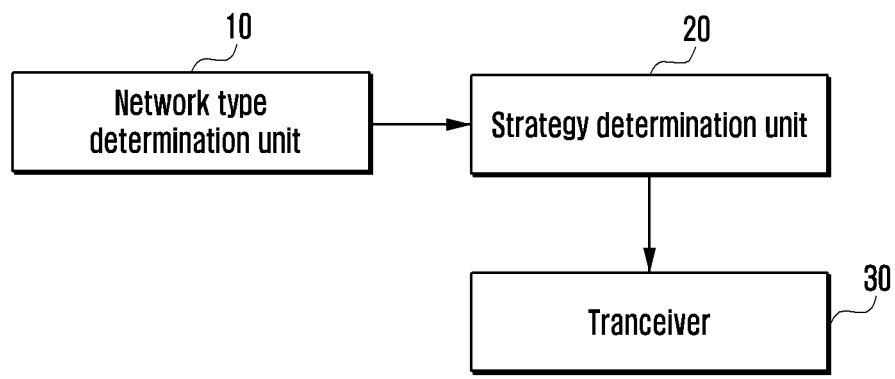
FIG. 3 illustrates a block diagram of an apparatus for adjusting a data strategy in a terminal in accordance with embodiments of the present disclosure.

FIG. 3 illustrates a block diagram of an example apparatus for adjusting a data strategy. The terminal described in FIG. 3 may be any electronic device having networking functions, such as a smart phone, a tablet computer, a multi-medium player, a game console, a personal digital assistant, a desktop computer, a laptop computer and the like.

With reference to FIG. 3, the example apparatus for adjusting the data strategy may include a network type determination unit 10, a strategy determination unit 20 and a transceiver 30. It should be noted that the above network type determination unit 10, the strategy determination unit 20 and the transceiver 30 may be implemented as related hardware components, or the above three may be implemented by adopting logical programming devices (such as CPLD or FPGA devices) based on hardware design or programming, or using the digital signal processors (such as the DSP and so on) having the related calculation capability. Alternatively, the respective units may be implemented in software.

In particular, the network type determination unit 10 may be used to determine the network type used by the WIFI hotspot provider to which the terminal is connected in a WIFI mode. Herein, the WIFI hotspot provider may use the wired network (such as the optical fiber wideband or cable wideband network) which has no limitation in terms of the data strategy; moreover, the WIFI hotspot provider may also use the mobile network (such as the 2G mobile network, the 3G mobile network or the 4G mobile network) which has limitations in terms of the data strategy.

In one example, the network type determination unit 10 may determine the network type used by the WIFI hotspot provider based at least partially on a selection made by a user of the terminal. In particular, when the terminal is connected to the WIFI hotspot provider in the WIFI mode, a menu showing a list of network types used by the WIFI hotspot provider may be shown to the user so that the user may select the network type. For example, the list may include the options such as an "unlimited network", a "2G mobile network", a "3G mobile network", or a "4G mobile network." After the user selects from the list, the network type may be stored in a special storage area. In one example, the network type information selected by the user may also be stored in a profile of the WIFI hotspot (e.g., along with the password of the WIFI hotspot); thus, when the WIFI hotspot is accessed again, the corresponding WIFI hotspot provider network type information may be read directly from the profile. Moreover, the terminal may modify the network type in the profile in accordance with input by the user.

In a further example, the network type determination unit 10 may identify the network type used by the WIFI hotspot provider based at least partially on information received from the WIFI hotspot provider. For example, unlike the current WIFI protocol, the WIFI hotspot provider may voluntarily transmit the network type to the terminal, when the terminal is connected to the WIFI hotspot provider. The WIFI network type transmitted to the terminal may be directly read by the network type determination unit 10 as the "network access subtype" information, so as to determine the network type used by the WIFI hotspot provider. That is, the network type may be indicative of the network access subtype.

It is understood that the network type determination unit 10 described herein is merely illustrative and does not limit the scope of the present disclosure as defined by the appended claims and equivalents. Thus, any suitable approach for determining the network type of the WIFI hotspot provider may be adopted. For example, the approach in which the user makes a selection may be combined with the approach in which the WIFI hotspot provider makes a notification. By prioritizing these two approaches, it is possible to determine the network type more flexibly. In particular, assuming that the approach in which the user makes a selection is set to have a higher priority, when the WIFI hotspot provider transmits the network type, the user may still supersede the network type received by the provider by selecting, for example, the "unlimited network" from the list. On the other hand, it is also possible to set the information provided by the WIFI hotspot provider to have a higher priority, so as to supersede the network type selected by the user.

After the network type determination unit 10 determines the network type used by the WIFI hotspot provider, the strategy determination unit 20 determines the data strategy of the terminal based on the network type used by the WIFI hotspot provider. In general, the strategy determination unit 20 may determine the data strategy of the terminal in accordance with the network type used by the WIFI hotspot provider. That is, when the WIFI hotspot provider accesses the 2G network, the data strategy of the terminal is adjusted to the 2G strategy; when the WIFI hotspot provider accesses the 3G network, the data strategy of the terminal is adjusted to the 3G strategy; and when the WIFI hotspot provider accesses the unlimited network (for example, the optical fiber wideband or cable wideband and so on), the data strategy of the terminal is set to the WIFI strategy.

Transceiver 30 transmits and receives data in accordance with the data strategy of the terminal. The strategy determination unit 20 and the transceiver 30 may determine the data strategy and control the data transmission and reception with respect to the terminal as a whole, so as to efficiently control the network data usage of the terminal.

Hereinafter, an example method for adjusting a data strategy in a terminal will be described with reference to FIG. 4. Here, the method shown in FIG. 4 may be performed by the apparatus shown in FIG. 3, or may be implemented through computer software programming.

Figure 4:
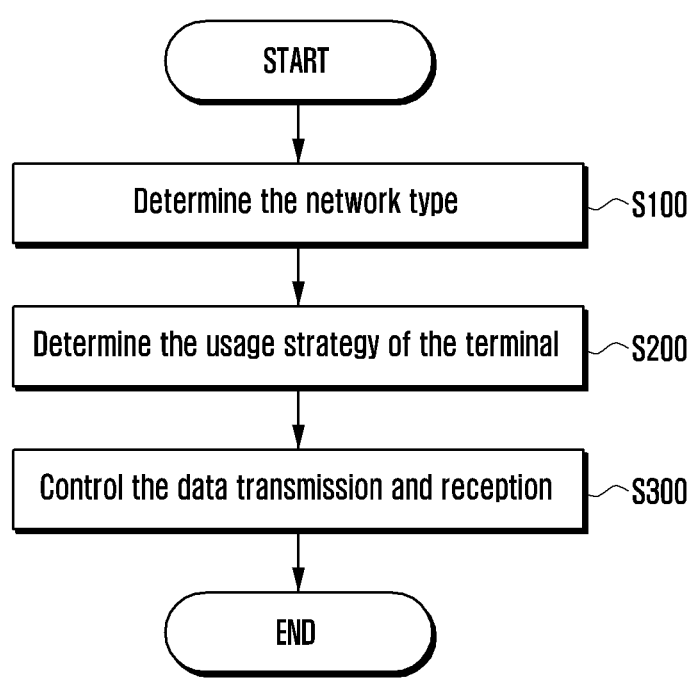
FIG. 4 illustrates a flowchart of a method for adjusting a data strategy in a terminal in accordance with embodiments of the present disclosure.

With reference to FIG. 4, in block S100, the network type used by the WIFI hotspot provider may be determined. As noted in an example above, the network type used by the WIFI hotspot provider may be determined based on the WIFI hotspot provider network type information received from a user of the terminal. In particular, when the terminal is connected to the WIFI hotspot provider in the WIFI mode, a menu including a list of the network types used by the WIFI hotspot provider may be shown to the user of the terminal, so that the user may select from the list the WIFI hotspot provider network type information. For example, the list may include the options such as an "unlimited network", a "2G mobile network", a "3G mobile network", a "4G mobile network" and so on. After the user selects from the list the WIFI hotspot provider network type information, the selected WIFI hotspot provider network type information may be stored in a special storage area. In addition, the WIFI hotspot provider network type information selected by the user may also be stored in a profile of the WIFI hotspot (for example, along with the password of the WIFI hotspot); thus, when the WIFI hotspot is accessed again, the corresponding WIFI hotspot provider network type information may be read directly from the profile. Moreover, the terminal may modify the WIFI hotspot provider network type information in the property information in accordance with the input of the user.

Hereinafter, a method for determining the network type used by the WIFI hotspot provider by obtaining the network access information based on the options of the user will be described with reference to FIGS. 5A-5B.

Figure 5A:
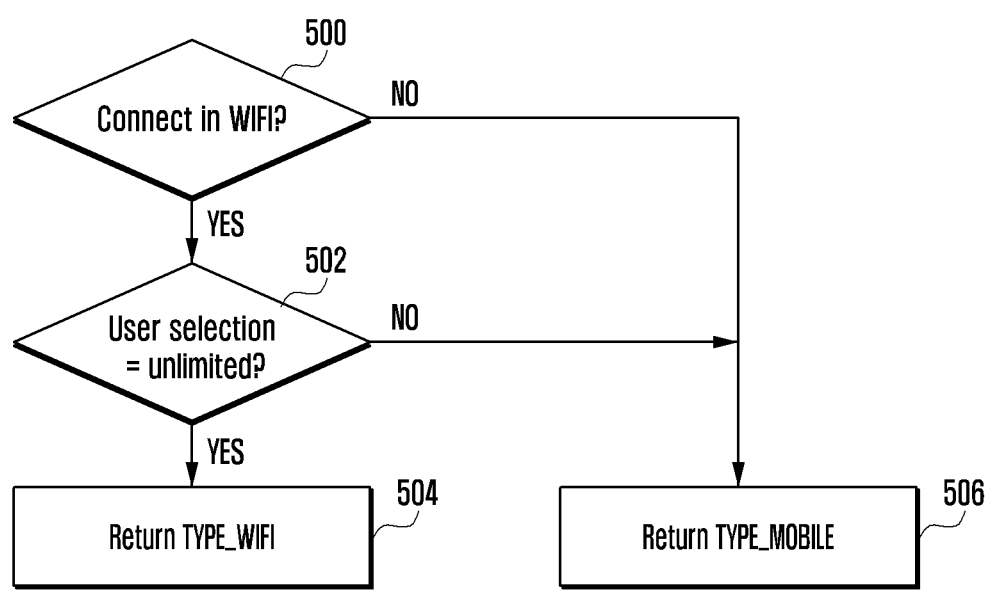
FIG. 5A and FIG. 5B illustrate a method of determining a network type used by a WIFI hotspot provider in a terminal in accordance with embodiments of the present disclosure.

FIG. 5A illustrates an example method for obtaining the network access type. In particular, when it is determined that the terminal is connected to the network in the WIFI mode at block 500, it is determined whether the user has selected the "unlimited network" at block 502. If it is determined that the user has selected the "unlimited network", the obtained network access type is the WIFI type (for example, the value of "TYPE_WIFI" is returned in the android system) at block 504, accordingly, it may be determined that the unlimited network (for example, the wired network such as the optical fiber wideband or cable wideband and so on) is used by the WIFI hotspot provider; and if the user does not select the "unlimited network", the obtained network access type is the mobile network type (for example, the value of "TYPE_MOBILE" is returned in the android system) at block 506. Moreover, when it is determined that the terminal is not connected to the network in the WIFI mode, the obtained network access type is also the mobile network type.

Figure 5B:
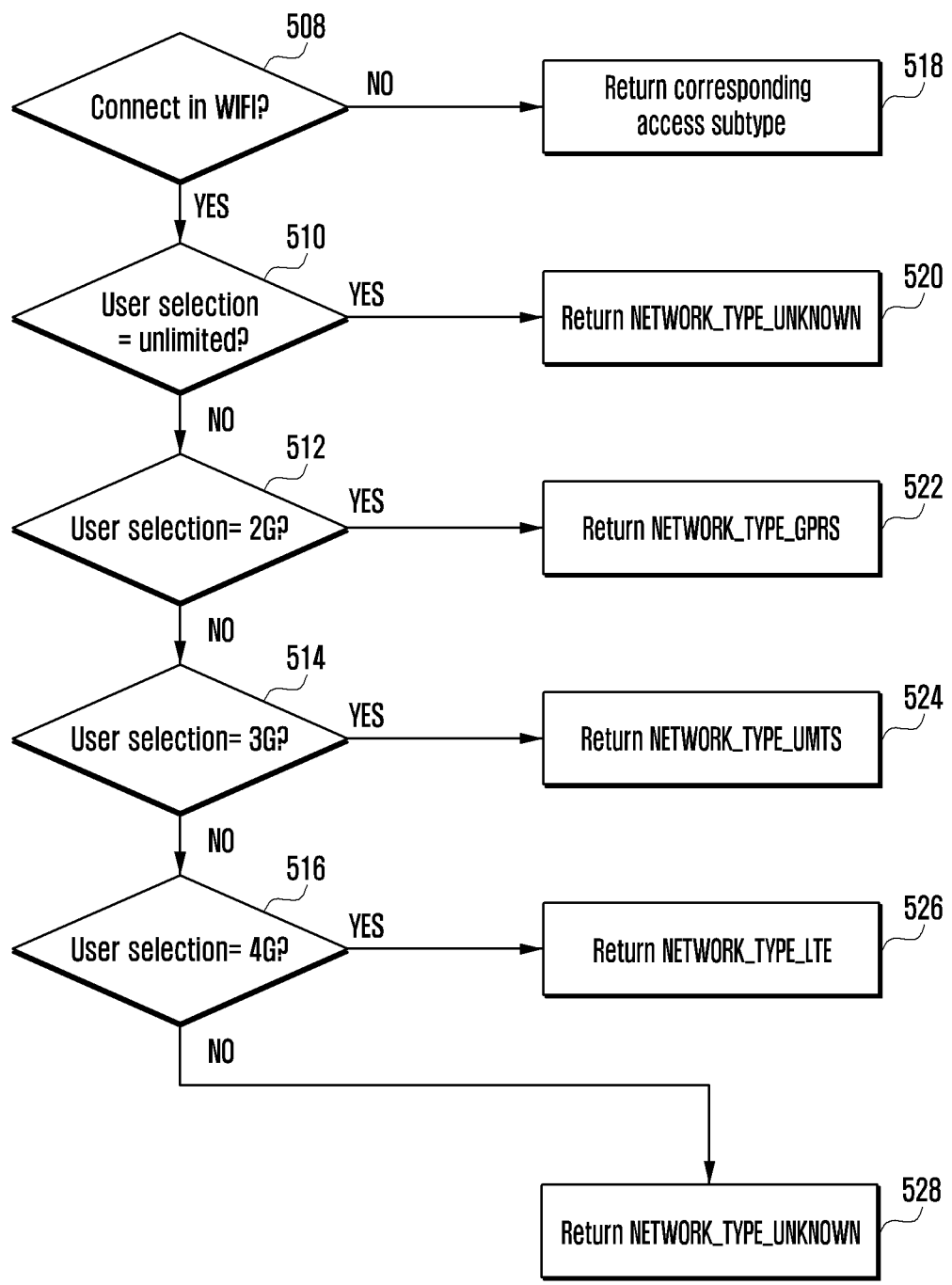

FIG. 5B illustrates an example method for obtaining the network access subtype. In particular, when it is determined the terminal is connected to the network in the WIFI mode at block 508, the options of the user are determined in turn, and corresponding network access subtype is determined in accordance with the selection by the user. For example, If it is determined that the user has selected the "unlimited network" at block 510, the returned network access subtype is the unknown type at block 520 (e.g., the value of "NETWORK_TYPE_UNKNOWN" is returned in the android system). Accordingly, it may be determined that the unlimited network (e.g., the wired network, such as the optical fiber wideband or cable wideband) is used by the WIFI hotspot provider. If it is determined that the user has selected the "2G network" at block 512, the returned network access subtype is the 2G network at block 522 (e.g., the value of "NETWORK_TYPE_GPRS" or other similar values, such as NETWORK_TYPE_CDMA, is returned in the android system). Accordingly, it may be determined that the 2G network is used by the WIFI hotspot provider. If it is determined that the user has selected the "3G network" at block 514, the returned network access subtype is the 3G network at block 524 (e.g., the value of "NETWORK_TYPE_UMTS" or other similar values, such as NETWORK_TYPE_HSDPA, is returned in the android system). Accordingly, it may be determined that the 3G network is used by the WIFI hotspot provider. If it is determined that the user has selected the "4G network" at block 516, the returned network access subtype is the 4G network at block 526 (for example, the value of "NETWORK_TYPE_LTE" is returned in the android system). Accordingly, it may be determined that the 4G network is used by the WIFI hotspot provider. On the other hand, when it is determined that the terminal is not connected to the network in the WIFI mode, the returned network access subtype is the corresponding mobile access subtype (for example, when accessing the 2G network, the corresponding value "NETWORK_TYPE_GPRS" or other similar values such as "NETWORK_TYPE_CDMA") is returned at block 518 in the android system. When accessing the 3G network, the value of "NETWORK_TYPE_UMTS" (or other similar values such as NETWORK_TYPE_HSDPA and so on) is returned in the android system and so on). Accordingly, it may be determined that the 2G, 3G or 4G network is used by the WIFI hotspot provider. In addition, other user options or invalid user options may be considered to be correspondence to the network access subtype as the unknown type.

The example of determining the network type used by the WIFI hotspot provider based on the option received from the user has been described with reference to FIGS. 5A-5B. However, as noted above the techniques herein are not limited to the above example.

Referring back to FIG. 3, in block S100, the network type used by the WIFI hotspot provider may also be determined based on the WIFI hotspot provider network type information received from the WIFI hotspot provider. For example, the WIFI hotspot provider may transmit the WIFI hotspot provider network type information to the terminal, and the WIFI hotspot provider network type information may be stored in the WIFI hotspot profile (for example, along with the password of the WIFI hotspot); thus, when the WIFI hotspot is accessed again, the corresponding WIFI hotspot provider network type information may be read directly from the profile, and the terminal may modify the WIFI hotspot provider network type information in the profile in accordance with an input of the user.

The methods shown in FIGS. 5A-5B may be applied to the solution for obtaining network access information based at least partially on the information transmitted by the hotspot provider, so as to determine the network type used by the WIFI hotspot provider.

In addition, the current WIFI protocol may be modified so that the WIFI hotspot provider may transmit the WIFI hotspot provider network type information to the terminal when the terminal is connected to the WIFI hotspot provider. In this instance, the WIFI hotspot provider network type information transmitted from the WIFI hotspot to the terminal may be used as the "the network access subtype" information, which is directly used to determine the network type used by the WIFI hotspot provider.

Please note that the above two approaches are only provided as examples, which do not intend to limit the scope of the present disclosure. It is understood that any suitable approach to determine the network type used by the WIFI hotspot provider may be implemented.

Referring back to FIG. 4, after determining the network type used by the WIFI hotspot provider, in block S200, the data strategy of the terminal may be determined based on the network type used by the WIFI hotspot provider. In general, the data strategy of the terminal may be determined based at least partially on the network type used by the WIFI hotspot provider. That is, when the WIFI hotspot provider accesses the 2G network, the data strategy of the terminal is adjusted to the 2G strategy; when the WIFI hotspot provider accesses the 3G network, the data strategy of the terminal is adjusted to the 3G strategy; and when the WIFI hotspot provider accesses the unlimited network (for example, the optical fiber wideband or cable wideband and so on), the data strategy of the terminal is adjusted to the WIFI strategy.

At block S300, data may be transmitted and received in accordance with the data strategy of the terminal.

Advantageously, the corresponding terminal data strategy is adjusted in consideration of the network type used by the WIFI hotspot provider, thereby overcoming the disadvantages caused by simply using the WIFI strategy. In addition, the solution provided by the present disclosure further uses a profile of the WIFI hotspot, so that an efficient adjustment mechanism may be established with respect to the hotspot connection.

It is understood that the techniques presented herein are not limited to the above examples and that the above described examples may be modified without departing from the spirit and scope of the present disclosure as defined by the appended claims and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter incompliance with 35 U.S.C. §101.

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

What is claimed is:

1. An apparatus comprising:
a processor to:
connect to a WLAN hotspot provider;
identify a network type used by the WLAN hotspot provider;
adjust a data strategy based at least partially on the network type used by the WLAN hotspot provider; and
transmit and receive data in accordance with the data strategy,
wherein the network type is stored in a profile of the WLAN hotspot provider in order to adjust the data strategy based on the network type when the apparatus reconnects with the WLAN hotspot provider.

2. The apparatus of claim 1, wherein the processor detects an input selection of the network type and identifies the network type based at least partially on the input selection.

3. The apparatus of claim 1, wherein the processor identifies the network type based at least partially on information received from the WLAN hotspot provider.

4. The apparatus of claim 1, wherein the processor modifies the network type stored in the profile.

5. The apparatus of claim 1, wherein the network type is indicative of a network access subtype.

6. A method comprising:
connecting to a WLAN hotspot provider;
identifying a network type used by the WLAN hotspot provider;
adjusting a data strategy based at least partially on the network type used by the WLAN hotspot provider; and
transmitting and receiving data in accordance with the data strategy,
wherein the network type is stored in a profile of the WLAN hotspot provider in order to adjust the data strategy based on the network type when the apparatus reconnects with the WLAN hotspot provider.

7. The method of claim 6, wherein determining the network type further comprises:
detecting an input selection of the network type; and
identifying the network type based at least partially on the input selection.

8. The method of claim 6, wherein determining the network type further comprises:
detecting receipt of information from the WLAN hotspot provider; and
identifying the network type based at least partially on the received information.

9. The method of claim 6, further comprising modifying the network type stored in the profile.

10. The method of claim 6, wherein the network type is indicative of a network access subtype.

* * * * *